(12) United States Patent
Hoffmann et al.

(10) Patent No.: US 12,200,055 B2
(45) Date of Patent: Jan. 14, 2025

(54) SYSTEM AND METHOD FOR DETERMINING INSIGHTS FROM SENSING INPUTS

(71) Applicant: Wiliot, Ltd., Caesarea (IL)

(72) Inventors: Mathieu Hoffmann, San Diego, CA (US); Yaroslav Ross, San Diego, CA (US); Roberto Sandre, San Diego, CA (US); Tal Tamir, Even Yehuda (IL); Alon Yehezkely, Haifa (IL); Yaron Elboim, Haifa (IL); Tsvika Rabkin, Pardes Hanna-Karkur (IL); Ido Zelman, Hod HaSharon (IL)

(73) Assignee: Wiliot, Ltd., Caesarea (IL)

( * ) Notice: Subject to any disclaimer, the term of this patent is extended or adjusted under 35 U.S.C. 154(b) by 129 days.

(21) Appl. No.: 17/105,469

(22) Filed: Nov. 25, 2020

(65) Prior Publication Data

US 2021/0160349 A1 May 27, 2021

Related U.S. Application Data

(60) Provisional application No. 62/939,940, filed on Nov. 25, 2019, provisional application No. 62/940,024, filed on Nov. 25, 2019.

(51) Int. Cl.
*H04L 67/12* (2022.01)
*G06F 18/21* (2023.01)
*G16Y 20/10* (2020.01)
*G16Y 30/00* (2020.01)
*H04L 69/22* (2022.01)

(52) U.S. Cl.
CPC .............. *H04L 67/12* (2013.01); *G06F 18/21* (2023.01); *G16Y 20/10* (2020.01); *G16Y 30/00* (2020.01); *H04L 69/22* (2013.01)

(58) Field of Classification Search
CPC ........... G06Q 30/0217; G06Q 30/0211; G06Q 30/0639; G06K 7/10069; G06K 19/07758; H04L 67/12; H04L 69/22; G16Y 30/00; G06F 18/21
See application file for complete search history.

(56) References Cited

U.S. PATENT DOCUMENTS

| | | |
|---|---|---|
| 9,888,337 B1 | 2/2018 | Zalewski et al. |
| 10,140,820 B1 | 11/2018 | Zalewski et al. |
| 10,142,822 B1 | 11/2018 | Zalewski et al. |
| 10,178,449 B1 * | 1/2019 | Struhsaker ............... H04Q 9/00 |
| 10,355,730 B1 | 7/2019 | Zalewski et al. |
| 10,747,968 B2 | 8/2020 | Espinosa |

(Continued)

OTHER PUBLICATIONS

"Wirecard teams with SES-imagotag on in-store electronic shelf label technology", Mobile Payments Today, ttps://dialog.proquest.com/professional/docview/2302718197?accountid= 131444, 2019.

*Primary Examiner* — Khaled M Kassim
(74) *Attorney, Agent, or Firm* — M&B IP Analysts, LLC

(57) ABSTRACT

A system and method extracting insights from sensed data are provided. The method includes receiving at least one data packet from at least one IoT tag, extracting at least one parameter from the at least one received data packet, where the parameter is a measure of the at least one IoT tag, identifying patterns from the at least one extracted parameter, and determining an insight based on the identified patterns.

19 Claims, 6 Drawing Sheets

(56) References Cited

U.S. PATENT DOCUMENTS

| | | |
|---|---|---|
| 11,494,569 B2 | 11/2022 | Espinosa |
| 2006/0152369 A1 | 7/2006 | Reunamaki |
| 2008/0021766 A1 | 1/2008 | McElwaine et al. |
| 2008/0224826 A1 | 9/2008 | Kuwako et al. |
| 2010/0109852 A1 | 5/2010 | Bauchot et al. |
| 2011/0199190 A1 | 8/2011 | Sano |
| 2015/0236551 A1 | 8/2015 | Shearer et al. |
| 2017/0187807 A1* | 6/2017 | Clernon ................. H04L 67/34 |
| 2017/0279631 A1* | 9/2017 | Britt ....................... H05B 6/668 |
| 2017/0365157 A1* | 12/2017 | Shoari .................... G01K 13/00 |
| 2018/0208448 A1* | 7/2018 | Zimmerman ........ G06K 7/1413 |
| 2018/0249735 A1 | 9/2018 | Espinosa |
| 2019/0116091 A1* | 4/2019 | Bijavara Aswathanarayana Rao ....................... H04L 67/322 |
| 2019/0150134 A1* | 5/2019 | Kakinada ............ H04W 72/048 370/330 |
| 2019/0188876 A1 | 6/2019 | Song et al. |
| 2020/0126125 A1 | 4/2020 | Sanjay et al. |
| 2020/0309828 A1* | 10/2020 | Ahn ..................... G01R 22/063 |
| 2020/0349328 A1 | 11/2020 | Espinosa |
| 2021/0099881 A1* | 4/2021 | Loupos ............... H04W 12/088 |
| 2021/0104335 A1* | 4/2021 | Han ....................... G16Y 10/05 |
| 2021/0125143 A1* | 4/2021 | Bartlett ................. G16Y 20/10 |
| 2021/0174665 A1* | 6/2021 | Shoari ................. G08B 21/245 |

* cited by examiner

SYSTEM AND METHOD FOR DETERMINING INSIGHTS FROM SENSING INPUTS

CROSS-REFERENCE TO RELATED APPLICATIONS

This application claims the priority benefit of U.S. Priority Application No. 62/940,024, filed on Nov. 25, 2019 and the priority benefit of U.S. Provisional Application No. 62/939,940, filed on Nov. 25, 2019. All of the applications referenced above are herein incorporated by reference.

TECHNICAL FIELD

The present disclosure relates generally to a system and method for determining insights, and more particularly, a system and method for determining insights from data gathered by battery-less sensing devices.

BACKGROUND

Traditional sensors are standalone devices that are locally resolved. That is, they are designed for a specific task and customized at a local level. As such, the capability of the sensors is limited to what it is initially intended for. For example, a temperature sensor will always remain as a temperature sensor.

Also, in measuring independent parameters such as temperature and humidity, each type of sensor is separately part of separate standalone systems. That is, both temperature and humidity sensors may be included in the same device. However, these two sensors make their measurements separately independent of each other.

More recently, some devices may implement some flexibility with over-the-air updates that may modify the function of the sensors. However, local resolution still limits the capability to locally available computing resources. The rigid customization of the devices' functions are costly, and over-the-air updates come at a cost premium regarding providing processing capability and data reception for the devices.

The Internet of Things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that go beyond Machine-to-Machine (M2M) communications and covers a variety of protocols, domains, and applications.

IoT can be encapsulated in a wide variety of devices, such as heart monitoring implants, biochip transponders on farm animals, automobiles with built-in sensors, automation of lighting, Heating and Ventilation Air Conditioning (HVAC) systems, and appliances such as washer/dryers, robotic vacuums, air purifiers, ovens or refrigerators/freezers that use Wi-Fi for remote monitoring. Typically, IoT devices encapsulate wireless sensors or a network of such sensors.

Most IoT devices are wireless devices that collect data and transmit such data to a central controller. There are a few requirements to be met to allow widespread deployment of IoT devices. Such requirements include reliable communication links, low energy consumption, and low maintenance costs.

To this aim, an IoT device and wireless sensors are designed to support low power communication protocols, such as Bluetooth Low Energy (BLE), Long Range (LoRa) platform, and the like. To achieve low power consumption, at the physical layer, a wireless BLE-compliant device can be configured as a transmitter or a receiver. That is, a device can implement only a transmitter or a receiver. At the Link Layer, devices are divided into advertisers, scanners, slaves, and masters. An advertiser is a device that transmits packets; a scanner is a device that receives the advertiser's packets. A slave is connected with a master. Typically, advertisers and slaves have the lowest possible memory and processing burden, thus demonstrating low power (energy) consumption.

On the other hand, the scanners and masters perform most of the processing and, thus, are equipped with batteries, user interfaces, and possibly even an electricity supply. In an IoT network (i.e., a network of IoT devices), a typical design would be to shift most processing tasks from slaves to masters and from advertisers to scanners. Such a design would reduce the power consumption of the most resource-constrained devices, to the cost of the most resource-intensive devices.

That is, all electronic devices require a power source to operate. Even devices, such as low-power Internet of Things (IoT) devices, that are designed to support low power communication protocols operate using a battery (e.g., a coin battery). As an alternative to batteries, power supply may be harvested from other sources, such as light, mechanical movement, and electromagnetic power, e.g., existing Radio Frequency (RF) transmissions. The harvested power is stored in a rechargeable battery.

The current sensing solutions today rely on an ad-hoc sensor (accelerometer, gyroscope, etc.), in addition to a Bluetooth-capable System-on-Chip (SoC) to trigger via Bluetooth the activation of a remote display for product advertisement. The use of an external sensing element, or the encapsulation of an ad-hoc sensor on the SoC adds cost to the overall solution. Also, when using a BLE radio, an external crystal is used today to provide a timing and frequency reference for the BLE physical layer (PHY) modulation/demodulation, thus increasing the total cost of the solution as well as the space required for a final product integration. Finally, the combination of the pick-up sensing and Bluetooth radio requires today the use of a battery, which makes it unsuitable for an end product integration because of limited embeddability for several products. The integration of a battery to power the SoC, the external crystal and the sensor (if external) has also the disadvantage of maintenance, cost of battery replacement as well as disposition and recycling.

That is, the reliance on a power source such as a battery is a limiting factor for electronic devices due to cost, size, lack of durability to environmental effects, requires frequent replacement, and the like.

Further, it is difficult to make sense of the data collected by IoT devices, and a lot of resources need to be used to interpret the data.

Artificial Intelligence has been used to process massive amount of data. The machine learning processes involved with the application of artificial intelligence include supervised and unsupervised learning. In supervised learning, each data is classified to build a model. The classification is often done manually by a classifier, which is time consuming, costly, and unwieldy when number of data collected is large.

With unsupervised learning, grouping or clustering of data as they are received is achieved without the need to classify each data. However, real-time inference of an event is difficult to achieve, as the discovery of hidden patterns in data without guidance of classified data is time consuming. Also, external evaluation is still required, which further adds to time and cost.

In view of the above discussion, there is a need to provide a system that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for extracting insights from sensed data. The method includes receiving at least one data packet from at least one IoT tag, extracting at least one parameter from the at least one received data packet, where the parameter is a measure of the at least one IoT tag, identifying patterns from the at least one extracted parameter, and determining an insight based on the identified patterns.

Certain embodiments disclosed herein also include a non-transitory computer readable medium having stored thereon causing a processing circuitry to execute a process, the process includes receiving at least one data packet from at least one IoT tag, extracting at least one a parameter from the at least one received data packet, where the parameter is a measure of the at least one IoT tag, identifying patterns from the at least one extracted parameter, and determining an insight based on the identified patterns.

Certain embodiments disclosed herein also include a system for detecting a pick-up of an item. The system includes: a processing circuitry; and a memory, the memory containing instructions that, when executed by the processing circuitry, configure the system to receive at least one data packet from at least one IoT tag, extract at least one parameter from the at least one received data packet, where the parameter is a measure of the at least one IoT tag, identifying patterns from the at least one extracted parameter, and determining an insight based on the identified patterns.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
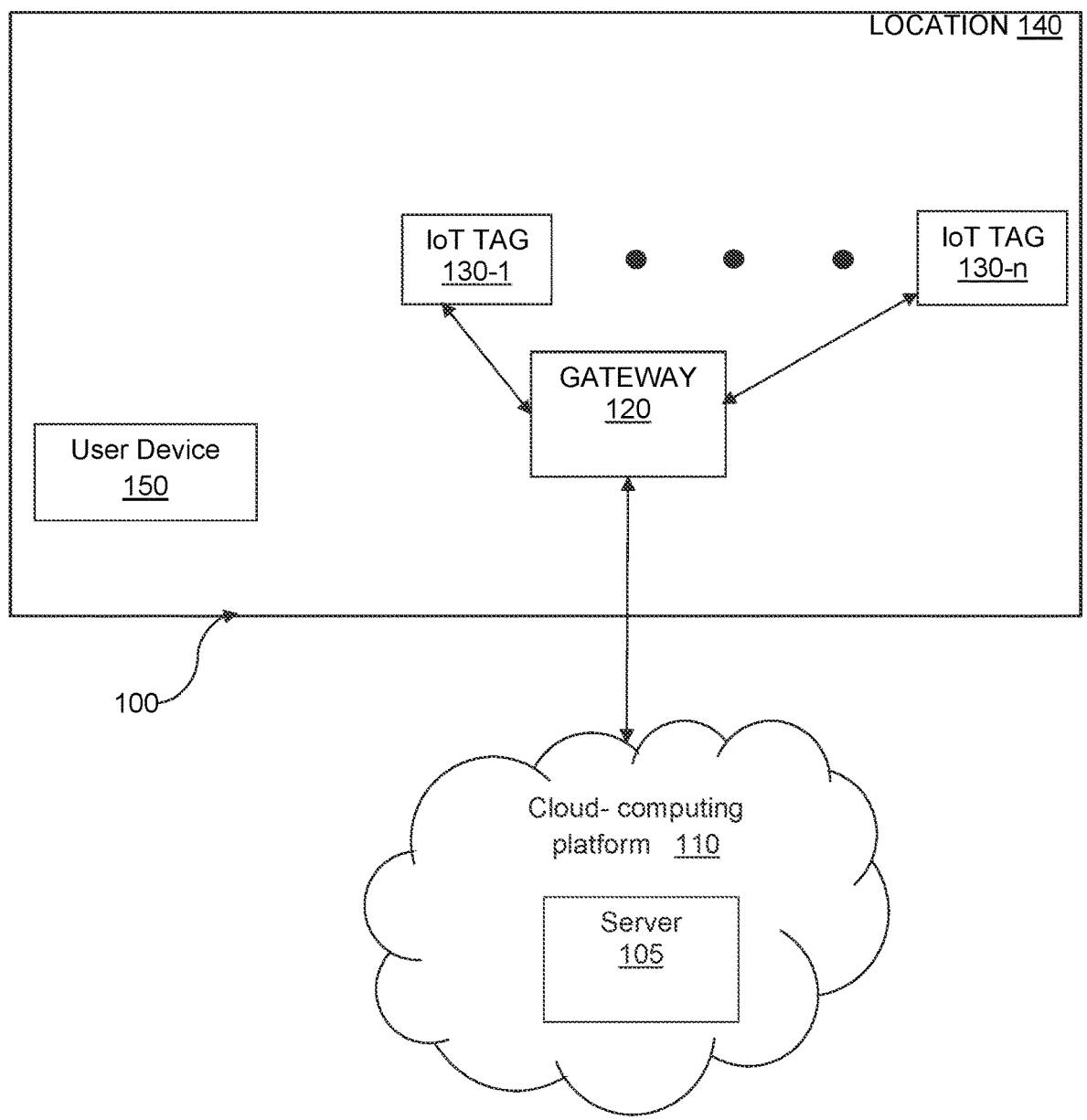
FIG. 1 is a schematic diagram of a system utilized for extracting insights from sensed data, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments involve a system and method that combines multiple sensing inputs and calibration data into a single or multiple radio device and applying algorithms in a second device to identify patterns sensing the environment of the first device to extract insights. More specifically, the system includes a system-on-chip that detects changes in environmental parameters and automatically compensates and calibrates the sensors so that the sensor remains at optimal performance in detecting certain parameters. Local processing in the chip ensures that automatic optimization is performed continuously in real time. The local information including sensor value and calibration may then be transmitted electronically to another system. The other system may be a mobile device such as a phone, a gateway, or a distributed device in the cloud network, with infinite resource for improving performance continuously.

Also, the other system analyzes the data received from the first system above using artificial or machine learning algorithm, recognizes patterns matching the environmental changes the first system is subjected to. The data gathered may also be aggregated to generate insights on a set of products.

In an example embodiment, the detection of such patters can be utilized for determining a pick-up of an item. In this embodiment, a system deployed, for example, in a cloud computing platform is configured to process signals received from an Internet of Things (IoT) tag attached to the item. The IoT tag transmits the signals to a local gateway using a low-power communication protocol. The gateway relays the signals to the server over, for example, the Internet. In an embodiment, the IoT tag does not include any dedicated sensor to detect or otherwise sense pick up events.

As will be discussed as an example, the system may be configured to analyze the received signal detect or otherwise determine a pick-up event. Such an event indicates change in the physical location or orientation of the item monitored by a corresponding IoT tag. In an embodiment, a pick-up event is sent back to the gateway for activating the corresponding notification of pick-up on a remote screen close to the consumer in the store, or directly on the user smartphone (identified by among others by the consumer presence in the store and triangulating its proximity with the item being picked-up).

FIG. 1 is a schematic diagram of a pick-up detection system 100 utilized for extracting insights from sensed data, according to an embodiment. The pick-up detection system 100 includes a server 105 that may be deployed in a cloud computing platform 110, and a gateway 120 within a location 140, which may be a store, for example. The gateway 120 may be part of a hand-held device, such as a smart phone, a tablet, or portable microcomputer, and the like.

Also shown in FIG. 1 is a user device 150. The user device 150 is a user in the location 140. The user device 150 may be, for example, a smart phone, a wearable computing device, a tablet computer, and the like. The user device 150 may be connectively connected to the gateway 120 over a wireless network (e.g., Wi-Fi), Bluetooth network, near-field communication, and the like.

The location 140 also includes a plurality of Internet of Things (IoT) tags 130-1 through 130-n (collectively referred to as an IoT tag 130 or IoT tags 130).

In operation, each of the IoT tags 130 respectively attached to the items 135 are in communication with the gateway 120 within the locations 140. The gateway 120 is also in communication with the server 105 (directly, or through a series of other gateways in combination). Communication between IoT tags 130 and the gateway 120 is performed using low-energy communication protocol. An example for such protocol includes a BLE, which are short-wavelength radio waves operating at a range of about 2.40 to 2.485 MHz, and commonly used among portable mobile devices.

In an embodiment, the IoT tags 130 sense a particular RF activity relative to each other at a certain coordinate location. Upon pick-up of one of the items attached to one of the IoT tags 130, for example, the change of the coordinates of the IoT tag 130 being picked up within the location 140 leads to a change in an RF value detected by the IoT tag 130-1. As will be explained in more detail below, the IoT tag 130-1 sends the detected anomaly along with other information, including calibration data, to the gateway 120. The gateway 120 relays the combined information to the server 105, which performs further processing, including the identification of the patterns from the frequency word, and sends the results including insights determined from the identified patterns back to the gateway 120 for viewing by a user of the user device 150.

The results may include contents product information regarding the item attached to the IoT tag 130, such as videos, photos, or other information. The media content associated to such item may be displayed in a monitor located in proximity to where the merchandise is laid out, or directly to the consumer smartphone, identified because in proximity with the same item. In an embodiment, for example, pick-up analytics regarding the item may additionally be sent.

It should be noted that the server 105 may be implemented as a physical machine, a virtual machine, or combination thereof. The cloud-based platform 110 may be a public cloud, a private cloud, or a hybrid cloud.

In another embodiment, each IoT tag 130 is configured to send data packet to the gateway 120. The information in such data packets is later processed by the server 105. For example, the data packet may be processed to detect a pick-up event, i.e., that an item attached a respective an IoT tag 130 was picked by the user. In an embodiment, a data packet includes calibration data regarding the sensing by the IoT tag 130, various data parameters including a digital frequency word, and an Identification (ID) of the IoT tag 130. The frequency word that is measured by an IoT tag 130 depends on a frequency calibration of the IoT tag 130. Any changes to the temperature in the ambient environment or changes in the location of the IoT tag 130 will remove the tag from synchronization, thereby would change the value of the frequency word and result in a frequency shift. The frequency calibration is discussed in more detail with reference to FIG. 3.

Figure 2:
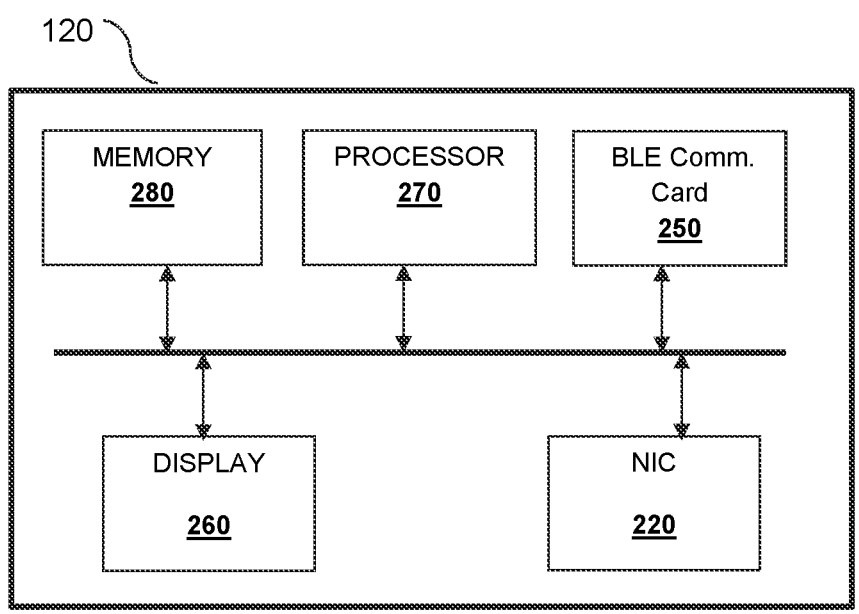
FIG. 2 is a detailed block diagram of a gateway utilized to collect signals from IoT tags according to an embodiment.

In an embodiment, the ID is a unique identifier (ID) of the IoT tag 130 created during production of the tag. The data packets sent by the IoT tags 130 are received at the gateway 120, which in turn, is configured to periodically send the data packets to the server 105. As illustrated in FIG. 2, the gateway 120 includes a BLE communication card 250 and a network interface card (NIC) 220, the BLE card 250 communicates with the IoT tags 130 over a BLE network (not shown), while the NIC 220 allows communication with the server 105 over the Internet (not shown), or other type of network.

In an embodiment, the gateway 120 may be installed with an agent or application executed by the processor 270 and stored in the memory 280. The agent, when executed, is configured to control the communication with the IoT tags 130 and the server 105. In an embodiment, the agent is may be configured to receive a pick-up event from the server 105 and display the respective notification of the display 260. For example, if an item attached to the IoT tag 130 is picked up, then a notification will be displayed.

It should be noted that processor 270 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 280 may be volatile (e.g., RAM, etc.), non-volatile (e.g., ROM, flash memory, etc.), or a combination thereof. The agent (or application) is realized in software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 270, cause the execution of the agent over the gateway 120.

Returning back to FIG. 1, the server 105 is configured to process the data packets received by the gateway 120 in order to extract parameters including the frequency word, for example, and other sensor outputs, calibration configuration, and other internal IoT tag 130 parameters, identify patterns from the frequency word, and determine an insight based on the identified patterns. In an embodiment, a pick-up event may be identified for a particular IoT tag 130. A pick-up event may be indicative of:

Movement—the IoT tag 130 was physically moved from its previous location;

Touch—the IoT tag 130 was touched by someone or something;

Pickup—the IoT tag 130 was picked up from its location;

Drop—the IoT tag 130 was dropped;

Put down—the IoT tag 130 was placed back in a steady location; and

Proximity—the IoT tag 130 was neither moved nor touch, but there is someone or something in its proximity that has not been there before.

In an embodiment, the detection of a pick-up event is based on analysis of the digital frequency words, including the identification of a pattern that consistently occurs with the pick-up event. That is, if any change is determined respective previously received word (i.e., if a frequency shift is detected), this is an indication that the location of the respective IoT tag has changed. The difference value between two consecutive received words can indicate on the type of change. From the pattern established regarding the change in value with the change of the location of the IoT tag 130, an insight may be determined that the IoT tag 130 has been picked up.

In the alternative, detection of RF values from multiple co-located IoT tags 130 may be analyzed within various temporal windows at a location 140 to determine which of the respective frequency words have anomalies. Co-location sensing may be detected by the gateway 120 within the common location 140. When stationary, the IoT tags 130 may have similarly sensed RF values.

In an embodiment, upon determining of the insight from the identified patterns, such as the detection of a pick-up event, a pick-up notification is sent from the server 105 to the gateway 120. The pick-up notification includes an ID of the respective IoT tag 130 and information to be displayed. The information may include, for example, a description of the item associated with the IoT tag 130, photos or videos about the item, prior customer reviews about the item, discounts, availability, or alternative designs of the item, and the like. The information to be included in the pick-up notification can be configured by the user (e.g. a store owner) through a web portal (not shown).

In an embodiment, the association between the user and the product is performed by triangulating the ID of the IoT tag 130 associated with the item 135 with the user device's 150 location. In another embodiment, the association is performed by a two-factor identification where the IoT tag 130 associated with the item is received by the server 105 sent via the gateway 120 and the user device 150, or using the user device 150 as the bridge to the server 105.

The embodiment described above is an example of detecting a pick-up event of the IoT tag 130 attached to the item. However, change of the parameters that is detected by the IoT tag 130 including the frequency word may be associated with other environmental changes. For example, the detection of the change in frequency word as described above may be associated with finer movement recognition, such as twisting, stretching, or bending of the item, orientation of the item, vibration of the item, proximity of another item with the item attached to the IoT tag 130, or tampering of an item to which the IoT tag 130 is attached to, based on association of the change with the pattern established regarding such movement. In another embodiment, the change of parameters including frequency word may be associated with a change in temperature, amount of light in the environment, vibration of a material, humidity of the area in which the IoT tag 130 is located, and other environmental changes.

In another embodiment, the change of parameters including frequency word may be associated with a material make-up in a container, or the filling of such material in an empty container, by comparing the parameter difference between a container filled with the material with an empty material. Additionally, the fill-rate of such a material may be determined based on measurement of the parameters including the frequency word at different points in time. Further, as every material, including living material, may give off a different data parameter "signature", the change of parameters including frequency word may be used to identify the presence of living organisms including viruses or bacteria, once the pattern of frequency word associated with the presence of such organisms are identified. Also, materials detection based on frequency shift may be applied to identify materials that have undergone changes in their chemical properties, including corrosion. When the material includes food products, spoilage of food may also be identified. Further, based on the parameters including frequency word detected, radioactivity of the material may also be identified.

In a further embodiment, the detection of change in parameters may be used as a trigger for further actions to be implemented by the system. For example, with the detection of a pick-up of the IoT tag 130 attached to the item, the system 100 (i.e., the server 105) may be triggered to search for further content associated with the item to be displayed on a display. Additionally, such a detection of change in parameters may serve as a trigger to determine information regarding the user of the user device 150, or to start a purchasing (i.e., product check out) procedure that is to be displayed on the user device 150. In another embodiment, the detection of parameter change may trigger a calibration of all of the IoT tags 130 so that future measurements are accurate.

Additionally, besides frequency word indicating frequency shift, other parameters may be detected by the IoT tags 130. This may include detection of heat, temperature, resistance, capacitance, inductance, and other characteristics that result in a change in electronic signals that are detected by the IoT tags 130.

Figure 3:
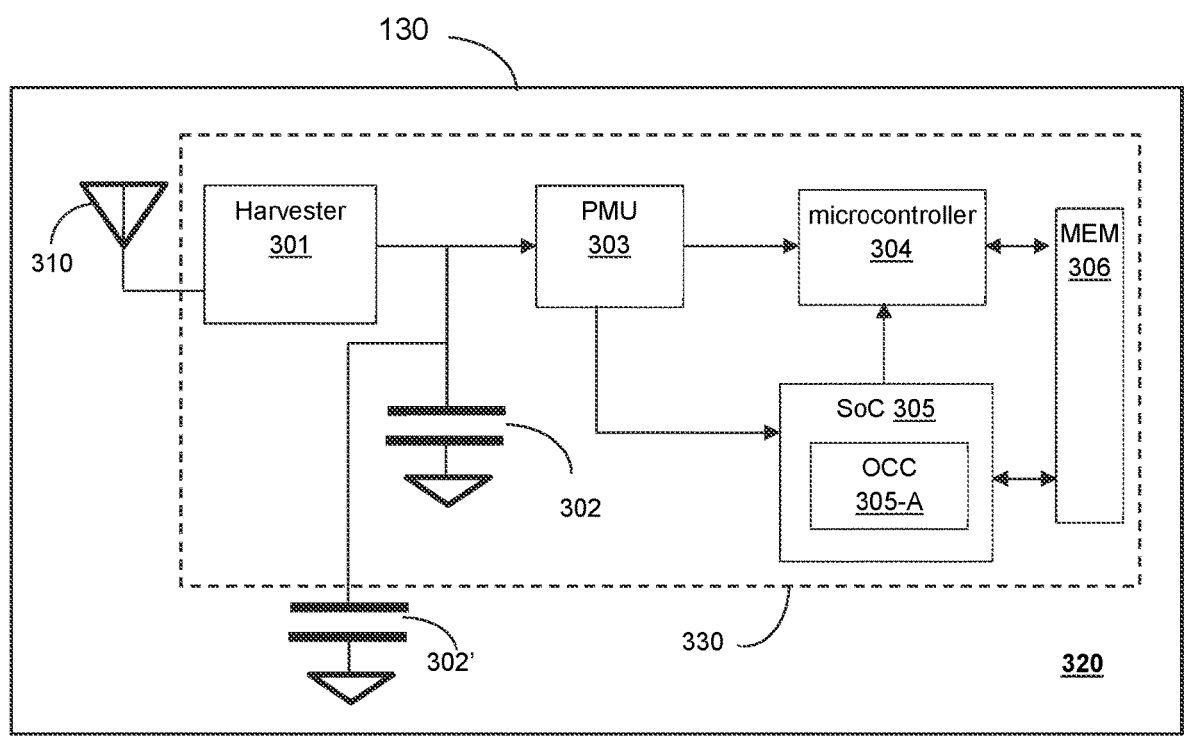
FIG. 3 is a schematic diagram of an IoT tag, according to an embodiment.

FIG. 3 shows an example schematic diagram of an IoT tag 130, designed according to the disclosed embodiments. The form factor of the IoT tag 130 is an on-die package-less. The IoT tag 130, as schematically demonstrated in FIG. 3, includes an energy harvester 301, coupled to an on-die capacitor 302 and an external passive capacitor 302', a power management unit (PMU) 303, a microcontroller 304, a system on chip (SoC) 305, and a retention memory 306. The IoT tag 130 further may include at least one antenna 310 glued to a substrate 320, for example. In another embodiment, the antenna 310 may be printed on the substrate or etched to the substrate. In a further embodiment, a passive external capacitor may take the place of the antenna 310.

In an embodiment, the substrate 320 is made of a low-cost material, such as, but not limited to, polyethylene (PET), polyimide (PI), and polystyrene (PS). In another embodiment, the substrate 320's pattern (layout) can be any of aluminum, copper, or silver. The glue utilized to glue to die and/or antenna 310 may be include materials such as an anisotropic conductive film (ACP), any type of conductive glue, solder past, and the like.

In the embodiment shown in FIG. 3, the antenna 310 is coupled to the harvester 301 and may be utilized for energy harvesting and wireless communication. In some embodiments, multiple antennas may be utilized to harvest energy at multiple frequency bands. Other embodiments may include one or more antenna for energy harvesting and an antenna to receive/transmit wireless signals at the BLE frequency band.

The SoC 305 includes a number of execution functions realized as analog circuits, digital circuits, or both. Examples for such execution functions are provided below. The SoC 305 is also configured to carry out processes independently or under the control of the microcontroller 304. Each process carried out by the SoC 305 also has a state, and processes can communicate with other processes through an IPC protocol. In the configuration illustrated in FIG. 3, the SoC 305 and/or the microcontroller 304 loads the context of processes and reads data from the retention memory 306.

The SoC 305 is partitioned into multiple power domains. Each power domain is a collection of gates powered by the same power and ground supply. To reduce the power consumption, only one power domain is turned on during execution. The SoC 305 can perform functions, such as reading from and writing to memory, e.g., of peripherals and can execute simple logic operations; tracking power level of the SoC 305; generating and preparing data packets for transmission; cyclic redundancy check (CRC) code generation; packet whitening; encrypting/decrypting and authentication of packets; converting data from parallel to serial; and staging the packet bits to the analog transmitter path for transmission.

In a preferred embodiment, the SoC 305 includes an oscillator calibration circuit (OCC) 305-A. The OCC 305-A includes at least one frequency locking circuit (FLC), each of which is coupled to an oscillator (both are not shown). The FLC calibrates the frequency of an oscillator using an over-the-air reference signal. In an embodiment, the calibration of the respective oscillator is performed immediately prior to a data transmission session and remains free running during the data transmission session. The FLC can be realized using frequency locked loop (FLL), a phased locked loop (PLL), and a delay locked loop (DLL). An example implementation of an oscillator calibration circuit 380 is discussed in U.S. patent application Ser. No. 15/994,388 to Yehezkely, assigned to the common assignee.

According to the disclosed embodiments, the energy harvester 301, the on-die capacitor 302, PMU 303, microcontroller 304, SoC 305, and the retention memory 306 are integrated in a die 330. The die 330 is glued to the substrate 320. The IoT tag 130 does not include any external DC power source, such as a battery.

In an embodiment, the microcontroller 304 implements electronic circuits (such as, memory, logic, RF, etc.) performing various functions allowing communication using a low energy (power) communication protocol. Examples for such a protocol includes, but are not limited to, Bluetooth®, LoRa, Wi-Gi®, nRF, DECT®, Zigbee®, Z-Wave, EnOcean, and the like. In a preferred embodiment, the microcontroller 304 operates using a Bluetooth Low energy (BLE) communication protocol.

In some embodiments, the microcontroller 304 is integrated with wireless sensors (not shown) to a complete an IoT device functionality.

The harvester 301 is configured to provide multiple voltage levels to the microcontroller 304, while maintaining a low loading DC dissipation value. In an example implementation, the energy harvester 301 may include a voltage multiplier coupled to the antenna 310. The voltage multiplier may be a Dickson multiplier, while the antenna is a 310 receive/transmit antenna of the microcontroller 304. That is, in such a configuration, the antenna is primarily designed to receive and/or transmit wireless signals according to the respective communication protocol of the low-energy IoT tag 130 (e.g., 2.400-2.4835 GHz signal for BLE communication).

It should be noted that the antenna 310 may also be designed for energy harvesting and may operate on a different frequency band, direction, or both, then those defined in the standard of the respective communication protocol. Regardless of the configuration, energy can be harvested from any wireless signals received over the air. Alternatively, energy can be harvested from any other sources, such as solar, piezoelectric signals, and the like. The harvested energy is stored in the on-die capacitor 302 and/or the external capacitor 302'.

The PMU 303 is coupled to the on-die capacitor 302 and is configured to regulate the power to the microcontroller 304 and SoC 305. Specifically, as the capacitance of the capacitor 302 is very limited, the power consumption should be carefully maintained. This maintenance is performed to avoid draining of the on-die capacitor 302, thus resetting the microcontroller 304. The PMU 303 can be realized using a Schmitt trigger that operates on a predefined threshold (Vref), e.g., Vref=0.85V.

In another embodiment, the PMU 303 may be further configured to provide multi-level voltage level indications to the microcontroller 304. Such indications allow the microcontroller 304 to determine the state of a voltage supply at any given moment when the on-die capacitor 302 charges or discharges. According to this embodiment, the PMU 303 may include a detection circuitry controlled by a controller. The detection circuity includes different voltage reference threshold detectors, where only a subset of such detectors is active at a given time to perform the detection.

The IoT tag 130 does not include any crystal oscillator providing a reference clock signal. According to an embodiment, the reference clock signal is generated using over-the-air signals received from the antenna 310. As noted above, in a typical deployment, a free running oscillator is locked via a phase-locked loop (PLL) to a clock, originating from a crystal oscillator. According to the disclosed embodiments, the OCC 305-A calibrates the frequency of an oscillator using an over-the-air reference signal. The oscillator(s) implemented in the IoT tag 130 are on-die oscillators and may be realized as a digitally controlled oscillator (DCO).

The retention memory 306 is a centralized area in the pick-up detection system 100 that is constantly powered. Data to be retained during low power states is located in the retention memory 306. In an embodiment, the retention area is optimized to subthreshold or near threshold voltage, e.g., 0.3V-0.4V. This allows for the reduction of the leakage of the retention cells.

Figure 4:
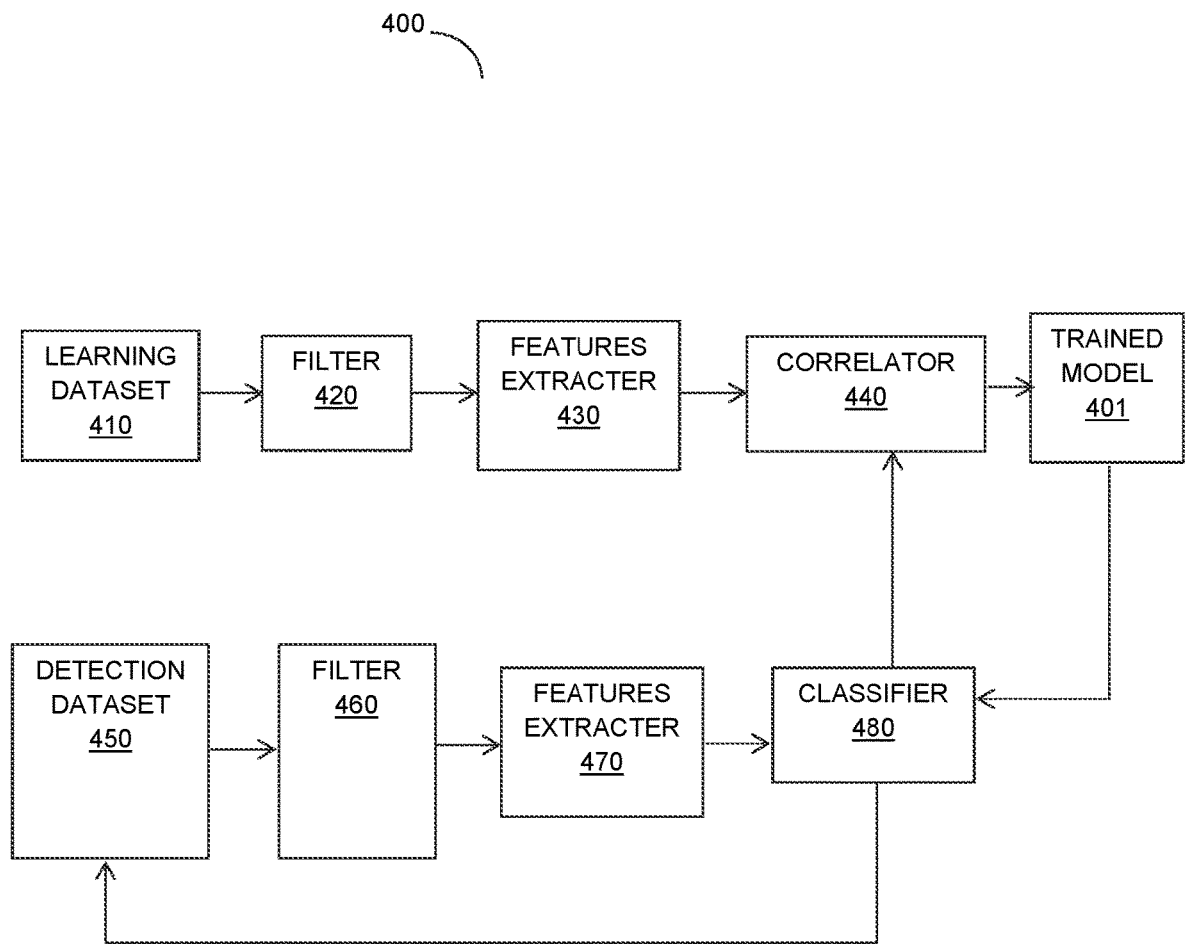
FIG. 4 is a flow diagram illustrating a training phase and a detection phase for a supervised model utilized for detecting a material, according to an embodiment.

FIG. 4 is a schematic diagram of a machine learning framework 400 utilized to detect pick-up by the IoT tag 130. For the sake of simplicity and without limitation on the disclosed embodiments, FIG. 4 will be discussed also with reference to the elements shown in FIG. 1.

The supervised machine learning framework 400 operates in two phases: learning and detection. In the learning phase, a trained model 201 is generated and trained, while in the detection phase, the trained model 201 is utilized for identification of a pattern and the determination of insights from the identified pattern. The trained model 401, in an embodiment, is generated and trained using semi-supervised machine learning techniques.

In the learning phase, packets include at least frequency words received from the IoT tags 130. Such received words are aggregated and saved as a learning dataset 410. The aggregation of frequency words may be for a predefined time window (e.g., all words during an hour-time window) or per IoT tag ID 130.

The learning dataset 410 is input to a filter 420 configured to filter out "noisy" readings of the frequency words. The filter 420 may be implemented using a boundary decision technique, outlier detection, and the like.

The filtered words are fed into a features extractor 430 configured to generate a set of features representing an interface event. Depending on the characteristic of the environment surrounding the IoT tag 130, for example, the location of the IoT tag 130 relative to other IoT tags within a location 140, the value of the frequency word may vary. By modeling the values of the frequency words, and attributing the values pattern to specific materials, the location of the IoT tag 130 may be identified. In an example a noise level of received frequency word may be one of the extracted features. That is, upon filtering, information of on the filtered noise is fed into the features extractor 430, such that eventually the train model refers also to noise level which can be different with respect to different locations of the IoT tag 130.

In an embodiment, the set of features include at least one feature. The feature extraction may include computing a value of frequency word or words using, for example, an FFT, delta values between two consecutive frequency words, and the like. The feature extraction may father consider the proximity between IoT tags 130 based on co-located group of tags.

The extracted features (values of frequency words) are fed to the correlator 440. In an embodiment, the correlator 440 implements a semi-supervised machine learning algorithm for analyzing the features and generating, using external supporting data, a trained model 401. Examples for the semi-supervised machine learning algorithm includes, and/or based on, a support vector machine (SVM), decision trees, label propagation, local outlier factor, isolation forest, and the like.

The supporting data includes labels of certain feature patterns previously identified as a particular location or motion information as, for example, when the learning dataset was gathered. For example, when the learning dataset was gathered at a room at certain temperature, an empty room, crowded room, and the like.

In an embodiment, the trained 401 model, generated by the correlator 440, is used to map or correlate unseen frequency words (features) to labels indicating the location or movement of the IoT tag 130. The unseen frequency words are analyzed during the detection phase.

According to an embodiment, the trained model 401 is generated when the IoT tags are at rest and at a controlled environment (e.g., a lab). It should be noted that the trained model 401 may be generated and trained based on information received from a plurality of co-located IoT tags.

In an embodiment, during the detection phase, frequency words received from the gateway 120 are aggregated and saved as a detection dataset 450. The aggregation is performed over a predefined detection time window or per tag ID.

The detection dataset 450 is input to the filter 460 that perform the filtration process as the filter 410. The filtered frequency words are fed to features extractor 470. The feature extraction may include computing a value of frequency word or words using, for example, an FFT, delta values between two consecutive frequency words, statistical information, and the like.

The set of features (values of frequency words) are fed to the classifier 480. The classifier 480 is configured to label the values of the frequency words identify the location and movement type of the IoT tag 130. The labeling is based on the trained model 401 and the set features vector of the respective IoT tag 130. The classifier 480 can be implemented using known classifying techniques utilized in supervised or semi-supervised machine learning. For example, the classifier 480 can be implemented as a k-means, a gaussian mixture model (GMM), a random forest, manifold learning, decision trees, and the like. In an embodiment, the labels provided by the classifier 480 may be fed into the correlator 440 to improve or otherwise update the model 201. In yet another embodiment, the labels provided by the classifier 480 may be fed to the detection dataset for labeling input words.

In an example embodiment, any the correlator 440, and the classifier 280 can be realized by one or more hardware logic components utilized to process artificial intelligence (AI) tasks, such as a digital signal processors (DSP), a tensor processing unit, or other AI accelerators.

The datasets 410 and 450 can be stored in a memory, which can be volatile (e.g., RAM, etc.) memory, non-volatile (e.g., ROM, flash memory, etc.) memory, or a combination thereof. Alternatively, or collectively, the datasets 410 and 450 can be stored in a storage, or any other medium which can be used to store the desired information.

The machine learning framework 400 discussed herein can be trained to detect other interference events, such as proximity to an IoT tag 130, motion of the IoT tag 130, orientation of the IoT tag 130, a type of a material nearby the IoT tag 130, temperature changes in the IoT tag in temperature within the IoT tag 130's proximity, chemical or radio-active changes to the material nearby the IoT tag 130, and other parameters that result in changes detected signals.

Figure 5:
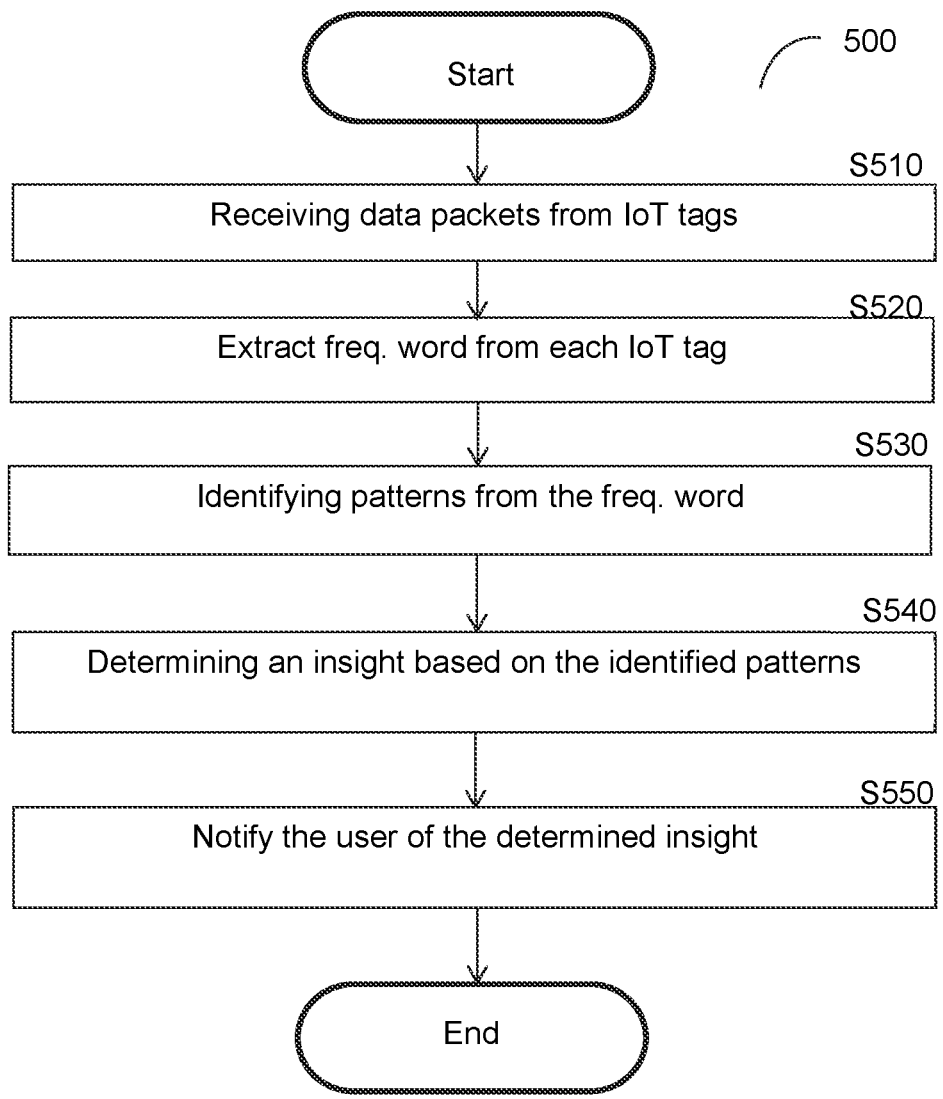
FIG. 5 is a flowchart for extracting insights from sensed data, according to an embodiment.

FIG. 5 is an example flowchart 500 for a method of detecting pick-up of an item 135, according to an embodiment. The method, in an embodiment, is performed by the server 105.

At S510, data packets for each of the IoT tags 130 are received by the server 105. These data packets may be received periodically from IoT tags 130, via the gateway 120 over a NIC 220, for example. Each of the data packets include a digital frequency word of the IoT tag 130, and an ID of the IoT tag 130. The ID may be a serial number for the IoT tag 130. The data packets may also include calibration data from each of the IoT tags 130.

Next, at S520, frequency words are retrieved from each IoT tag 130. The value of these frequency words depends on the frequency calibration of the IoT tag 130.

Further, at S530, the extracted frequency word is analyzed to identify certain patterns due to changes in the environment in which the IoT tag 130 is located, such as a change to the RF field that the IoT tag 130 is located, leading to a change to the value of the frequency word out of synchronization from previous measurement. This change in frequency word may be associated with an event, as patterns are identified over multiple measurements over time. Then, at S540, an insight is determined based on the identified pattern. Thereafter, at S550, the determined insight is sent to the gateway 120 to notify a user.

For example, in determining a pick-up event involving the picking-up of an item attached to the IoT tag 130, the pick-up event may occur due to temperature change at the location of the IoT tag 130, or location change for the IoT tag 130, which changes the value of the frequency word out of synchronization from previous measurements, and out of synchronization from the values of the other frequency words measured for the other IoT tags 130. The pattern of frequency word change may be associated with the pick-up of the specific IoT Tag 130, such that, an insight could be made that the IoT tag 130 is being picked up.

Upon detection of a pick-up event for a specific IoT Tag 130, a pick-up notification may be sent from the server 105 to the gateway 120. Here, the pick-up notification includes an ID of the respective IoT tag 130 and information to be displayed. The information may include content information associated with the item 135, such as descriptions about the item 135, photos or videos about the item 135, prior customer reviews about the item 135, discounts, availability, or alternative designs of the item 135, and the like. In one way, the pick-up information and the IoT tag ID 130 serve as the trigger for the server 105 to retrieve more content associated with the item. Viewed in another way, the pick-up information and the IoT tag ID 130 are pointers to the content associated with the content.

As an example, user may enter a store location 140. The user may see an item 135-1, in this case, a pair of glasses with black frame, and pick up the pair from among the items 135 of glasses. During this time, the IoT tag 130 detects the frequency word periodically, pairs the detected frequency word with the ID of the IoT tag and sends the information as converted data packet using BLE to the gateway 120. The gateway 120, upon receiving the paired information, relays the data packet to the server 105 using the NIC 220.

Upon receiving the IoT tag ID associated with the black framed glasses and the detected frequency word, the server 105 may then extract and analyze the frequency word to detect a pick-up event based on changes to the frequency word value due to movement. Upon detecting such a pick-up event, the server then sends a pick-up notification back to the gateway 120, which includes the ID of the IoT tag 130, and information to be displayed on the display 260 of the gateway 120. The displayed information may include videos, photographs, and the like.

With the above-described system, since the IoT tag 130 is battery-less and has an external bill of material list minimized, its size may be greatly reduced, such that the IoT tag 130 may more readily be attached to an item 135 at a location 140. Also, both the maintenance cost and time for the IoT tag 130 may be greatly reduced, as the need to replace batteries may be eliminated. Since there are no batteries to be disposed of, the system 100 is also more environmentally friendly compared to other devices where batteries are used.

Also, since only ambient RF energy at location 140 is detected by the at each of the IoT tags 130 and since BLE to communicate information from the IoT tag 130 to the gateway 120, energy consumption may be minimized. Additionally, since BLE, which is readily available in mobile devices and other set of end equipment such as access point, smart speakers, laptop computers, TV and monitors, is used to communicate information between the IoT tag 130 and the gateway 120, energy consumption may be minimized, and device compatibility between the IoT tag 130 and the mobile device housing the gateway 120 is readily assured. Therefore, the system as disclosed by the embodiments providing pick-up sensing may be economically implemented.

Figure 6:
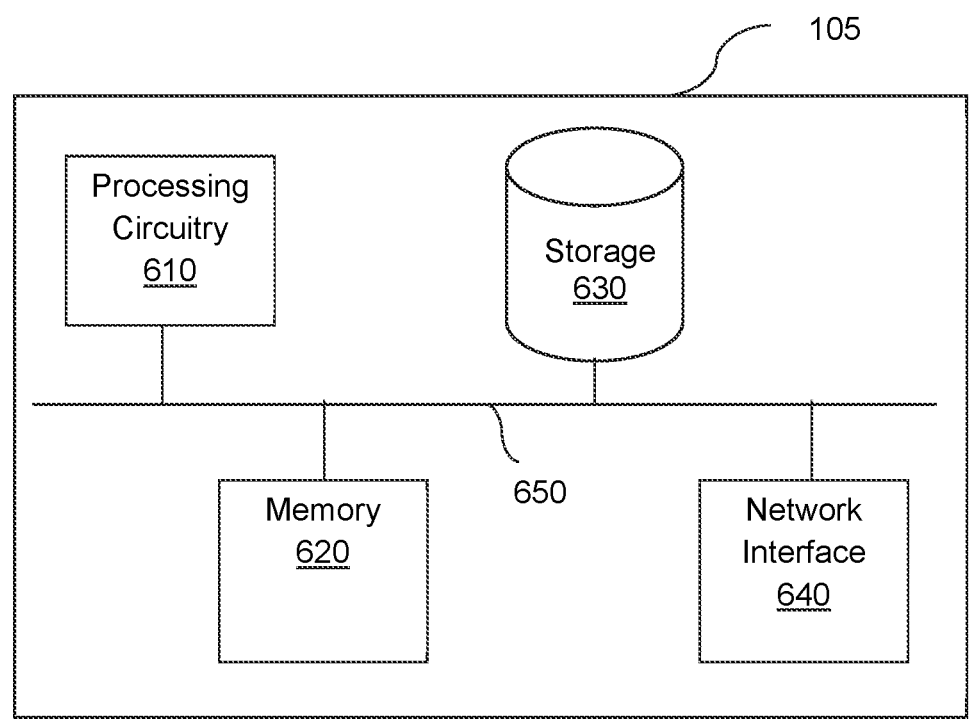
FIG. 6 is a schematic diagram of a server, according to an embodiment.

FIG. 6 is an example schematic diagram of the server 105 according to an embodiment. The server 105 includes a processing circuitry 610 coupled to a memory 620, a storage 630, and a network interface 640. In an embodiment, the components of the server 105 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the server 105 to communicate with the gateway 120 for the purpose of, for example, receiving data, sending data, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method performed by a computing system relating to an event occurring to an item coupled to an Internet of things (IoT) tag that is located remote from the computing system, comprising:
   receiving a plurality of data packets from the IoT tag;
   extracting at least one parameter value from each of the plurality of data packets, wherein the parameter values extracted from the data packets are indicative of a condition existing at the IoT tag and wherein the parameter values extracted from each of the data packets includes a parameter value derived from a calibration of a communication function of the IoT tag, wherein the calibration of the communication function of the IoT tag is based on an over-the-air reference signal received at the IoT tag and is performed immediately prior to the IoT tag transmitting at least one of the plurality of data packets received by the computing system;
   identifying a pattern based on the extracted parameter values;
   determining a nature of the event occurring to the item attached to the IoT tag based on the identified pattern; and
   performing, by the computing system, an action responsive to, and based on the determined nature of, the event.

2. The method of claim 1, further comprising:
   developing a model based on the identified pattern; and
   applying the model to packets received from the IoT tag subsequent to developing the model.

3. The method of claim 1, wherein at least one of the plurality of data packets further includes a data from a sensor of the IoT tag.

4. The method of claim 1, wherein each of the plurality of data packets is received periodically from the IoT tag via a gateway.

5. The method of claim 1, wherein the identified pattern indicates a change in a value detected by the IoT tag.

6. The method of claim 1, wherein the plurality of data packets are each transmitted from the IoT tag as an over-the-air signal.

7. The method of claim 1, wherein the at least one extracted parameter includes a frequency word.

8. The method of claim 1, wherein the event corresponds to one of:
   movement of the IoT tag;
   material make-up of an item placed near the IoT tag; and
   change in temperature surrounding the IoT tag.

9. The method of claim 1, further comprising wherein the action comprises:
   notifying a user of the determined nature of the event.

10. A non-transitory computer readable medium having stored thereon instructions for causing a processing circuitry to execute a process relating to an event occurring to an item coupled to an Internet of things (IoT) tag that is located remote from the processing circuitry, the process comprising:
    receiving a plurality of data packets from the IoT tag;
    extracting at least one parameter value from each of the plurality of data packets, wherein the parameter values extracted from the data packets are indicative of a condition existing at the IoT tag and wherein the parameter values extracted from each of the data packets includes a parameter value derived from a calibration of a communication function of the IoT tag, wherein the calibration of the communication function of the IoT tag is based on an over-the-air reference signal received at the IoT tag and is performed immediately prior to the IoT tag transmitting at least one of the plurality of data packets received by the processing circuitry;
    identifying a pattern based on the extracted parameter values;
    determining a nature of the event occurring to the item attached to the IoT tag based on the identified pattern; and
    performing, by the processing circuitry, an action responsive to, and based on the determined nature of, the event.

11. A system to execute a process relating to an event occurring to an item, comprising:
    a processing circuitry; and
    a memory, the memory containing instructions that, when executed by the processing circuitry, configure the system to:
    receive a plurality of data packets from at least one Internet of things (IoT) tag that is located remote from the system, the IoT tag being coupled to an item that is located remote from the system;
    extract at least one parameter value from each of the plurality of data packets, wherein the parameter values extracted from the data packets are indicative of a condition existing at the IoT tag and wherein the parameter values extracted from each of the data packets includes a parameter value derived from a calibration of a communication function of the IoT tag, wherein the calibration of the communication function of the IoT tag is based on an over-the-air reference signal received at the IoT tag and is performed immediately prior to the IoT tag transmitting at least one of the plurality of data packets received by the system;
    identify a pattern based on the extracted parameter values;
    determine a nature of the event occurring to the item attached to the IoT tag based on the identified pattern; and
    perform an action responsive to, and based on the determined nature of, the event.

12. The system of claim 11, wherein the system is further configured to:
    develop a model based on the identified pattern; and
    apply the model to packets received from the IoT tag subsequent to developing the model.

13. The system of claim 11, wherein at least one of the plurality of data packets further includes a data from a sensor of the IoT tag.

14. The system of claim 11, wherein each of the plurality of data packets is received periodically from the IoT tag via a gateway.

15. The system of claim 11, wherein the identified pattern indicates a change in a value detected by the IoT tag.

16. The system of claim 11, wherein the plurality of data packets are each transmitted from the IoT tag as an over-the-air signal.

17. The system of claim 11, wherein the at least one extracted parameter includes a frequency word.

18. The system of claim 11, wherein the event corresponds to one of:
 movement of the IoT tag;
 material make-up of an item placed near the IoT tag; and
 change in temperature surrounding the IoT tag.

19. The system of claim 11, wherein the system is configured to perform the action by being further configured to:
 notify a user of the determined nature of the event.

* * * * *